United States Patent [19]
Umetsu et al.

[11] Patent Number: 6,144,511
[45] Date of Patent: Nov. 7, 2000

[54] OPTICAL DEVICE FIXING DEVICE

[75] Inventors: Hitoshi Umetsu; Takeyoshi Imaki, both of Kawasaki, Japan

[73] Assignee: Fujitsu Denso Ltd., Kanagawa-Ken, Japan

[21] Appl. No.: 08/808,383

[22] PCT Filed: Aug. 26, 1996

[86] PCT No.: PCT/JP96/02378

§ 371 Date: Feb. 28, 1997

§ 102(e) Date: Feb. 28, 1997

[51] Int. Cl.⁷ .............................. G02B 5/04; G03B 27/72
[52] U.S. Cl. ..................... 359/831; 359/833; 359/834; 356/71
[58] Field of Search ................... 359/831, 833, 359/834, 835, 836, 837, 811, 819, 822, 823; 356/71

[56] References Cited

U.S. PATENT DOCUMENTS

| | | | |
|---|---|---|---|
| 904,066 | 11/1908 | Jacob | 359/835 |
| 2,400,401 | 5/1946 | Eckerman et al. | 359/831 |
| 3,039,405 | 6/1962 | Barr | 359/831 |
| 4,470,664 | 9/1984 | Shirasawa | 359/831 |
| 4,727,859 | 3/1988 | Lia | 359/831 |

FOREIGN PATENT DOCUMENTS

| | | |
|---|---|---|
| 64-46713 | 2/1989 | Japan . |
| 4-338705 | 11/1992 | Japan . |
| 5-88064 | 4/1993 | Japan . |
| 5-242230 | 9/1993 | Japan . |
| 7-270669 | 10/1995 | Japan . |
| 7-270670 | 10/1995 | Japan . |
| 7-271960 | 10/1995 | Japan . |
| 5514798 | 8/1941 | United Kingdom .................. 359/831 |

*Primary Examiner*—Ricky D. Shafer
*Attorney, Agent, or Firm*—Blackwell Sanders Peper Martin

[57] ABSTRACT

The present invention relates to an optical element fixing device, and particularly to a prism mounting device for an optical device using light beam which passes through a prism or lens, a lens fixing device for aligning and fixing the center of a lens with a prescribed optical axis, and a device for fixing a reflecting mirror of an optical device. The invention can easily and securely position the prism to be press-contacted to the lens within a case, in which changes in the magnitude of press-contacting with the passage of time is very small. And, the lens can be securely fixed with its center accurately aligned with a prescribed optical axis. Besides, the reflecting mirror is fixed by a simple structure and a contact between the reflecting mirror and a plate spring is not limited to one point.

5 Claims, 13 Drawing Sheets

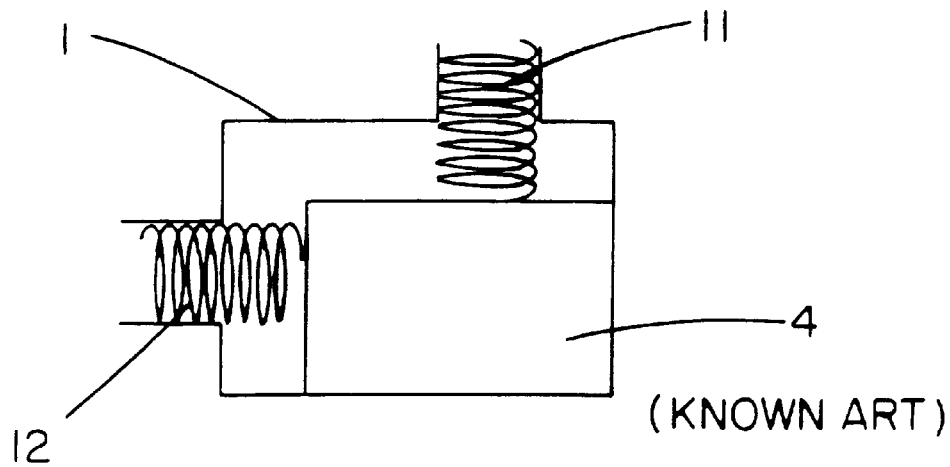
FIG. 13 (KNOWN ART)
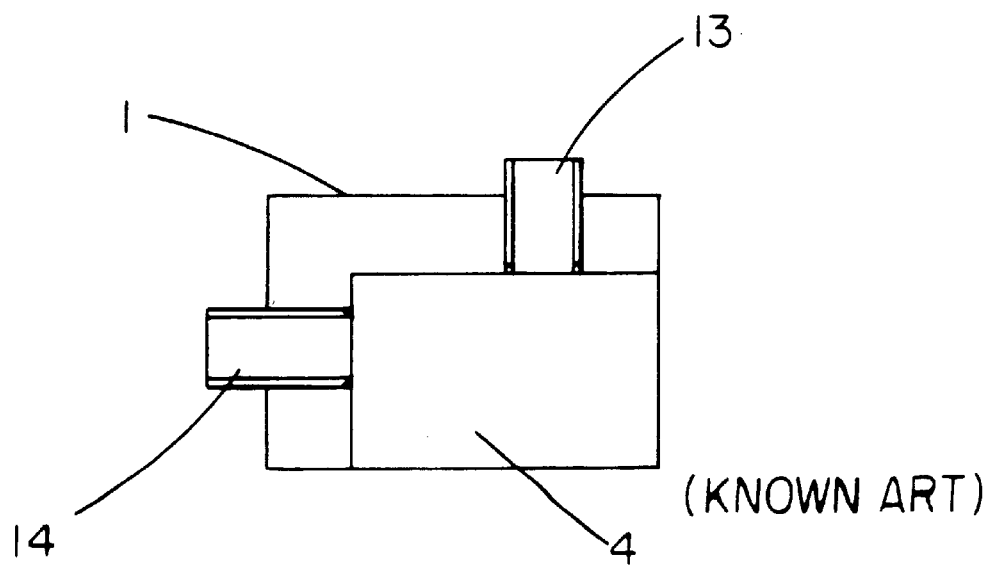
FIG. 14 (KNOWN ART)

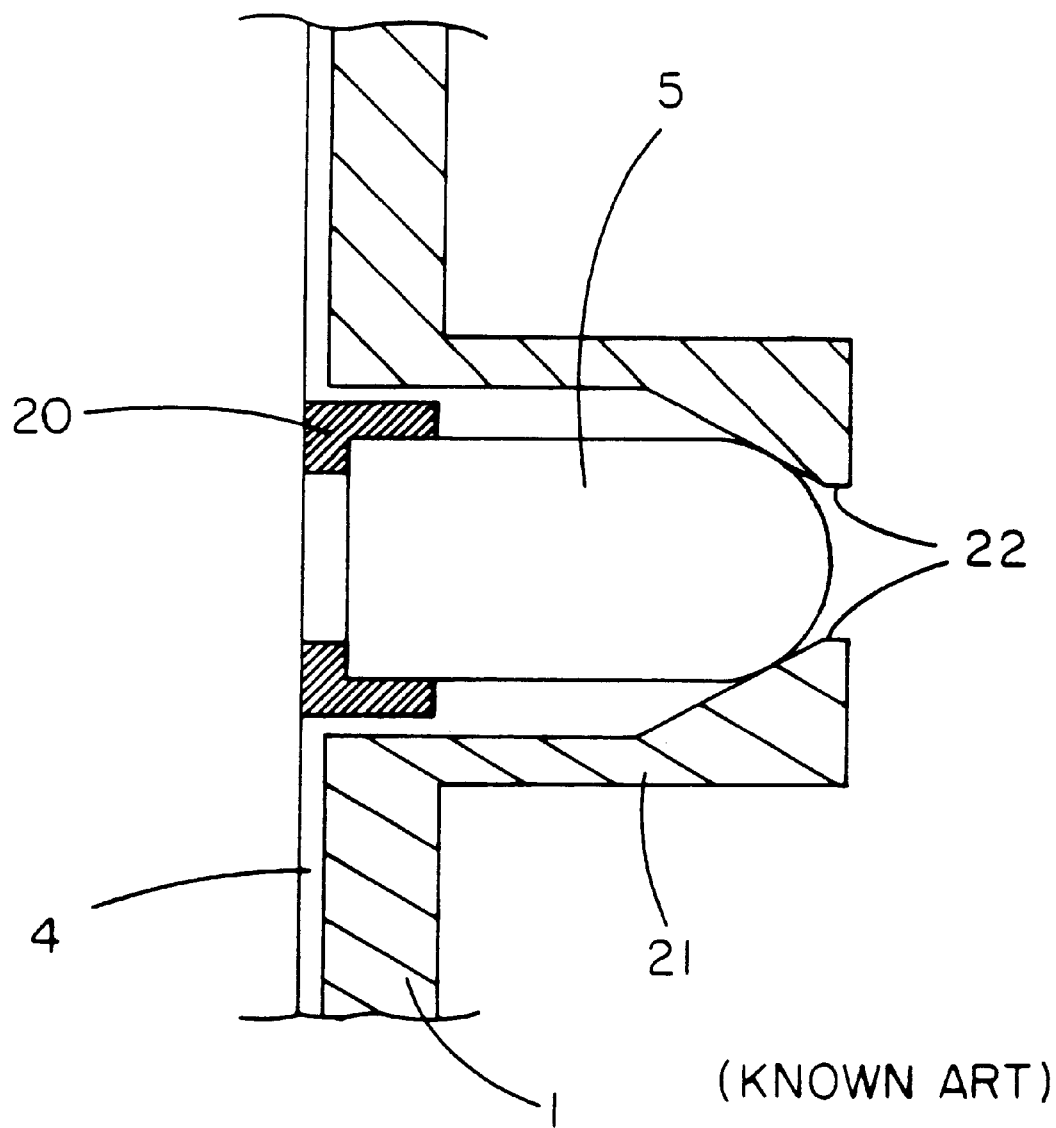
FIG. 17 (KNOWN ART)

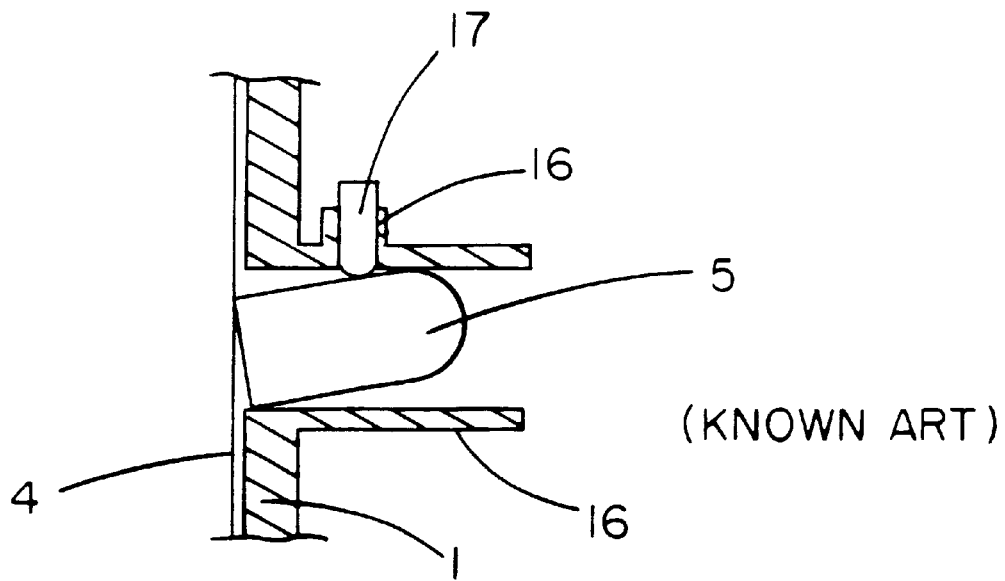
FIG. 18 (KNOWN ART)
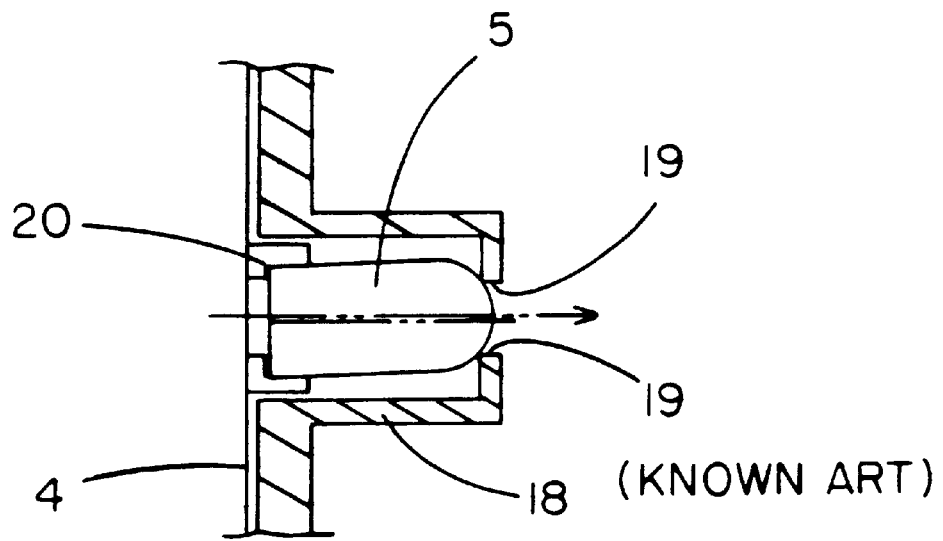
FIG. 19 (KNOWN ART)

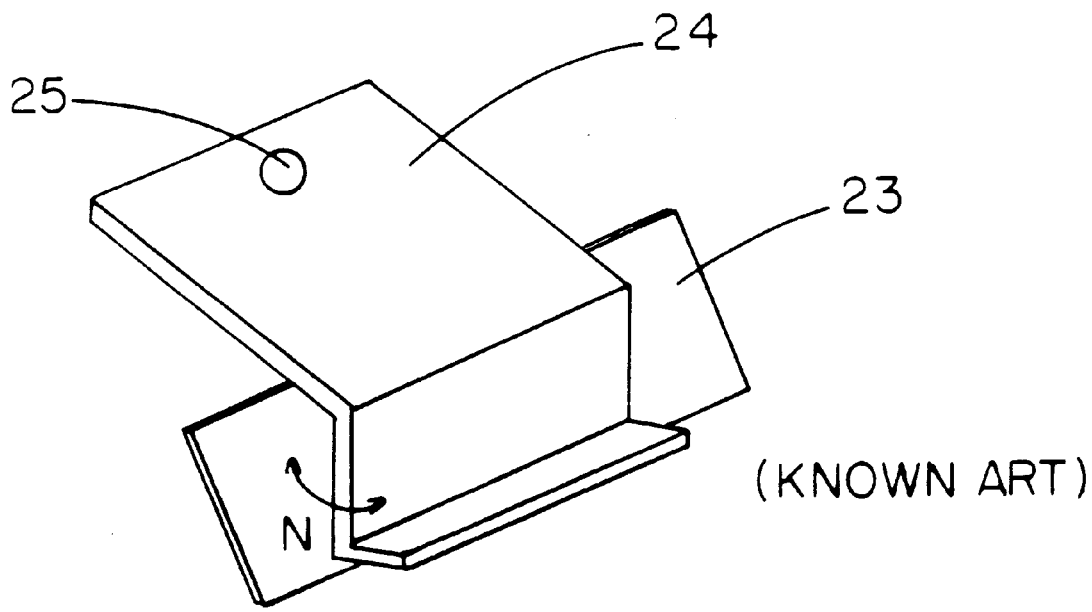
FIG. 20 (KNOWN ART)
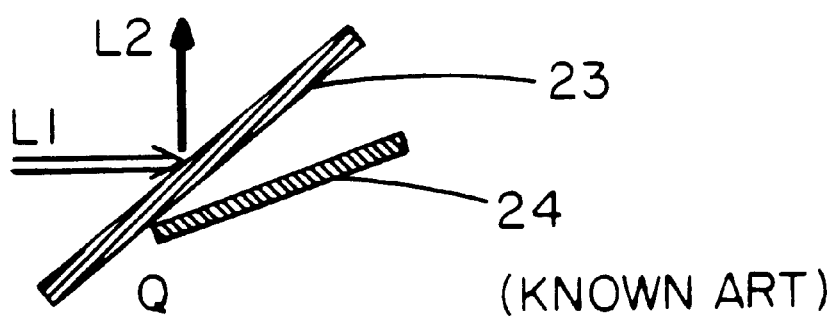
FIG. 21 (KNOWN ART)

OPTICAL DEVICE FIXING DEVICE

This application is a national stage application filed under 35 U.S.C. 371 of PCT/JP96/02378 filed on Aug. 26, 1996.

BACKGROUND OF THE INVENTION

1. Field of the Invention

The present invention relates to an optical device fixing device, and particularly to a prism mounting device for an optical device using light beam which passes through a prism or lens, a lens fixing device for aligning and fixing the center of a lens with a prescribed optical axis, and a reflecting mirror fixing device for fixing a reflecting mirror of an optical device.

2. Description of the Related Art

To open a locked door or to allow only registered persons to access to valuable data, a judging device according to fingerprint checking has been developed.

A conventionally known developed individual fingerprint checking device comprises a prism, a lens, and an image processing circuit. FIG. 12 shows such a device as a schematic vertical sectional view.

The device shown in FIG. 12 has a fingerprint checking device housed into a case 1 and a top lid 2 mounted at the top. Within the case 1, a prism 4 and a lens 5 are disposed substantially in a horizontal direction, and an emission unit 3 is positioned below the prism 4. The upper part of the prism 4 is in contact with the top lid 2. The prism 4 is positioned with its center axis aligned with the optical axis of the lens 5. A mirror 7 is positioned to reflect the light coming out of the lens 5, and the light reflected on the mirror 7 enters an image pickup device 8. The prism 4 is fully covered with a light impermeable material excluding a surface opposed to the emission unit 3, a surface on which a finger 9 is positioned, and a surface from which light is entered into the lens 5.

In the device shown in FIG. 12, when light is emitted from the emission unit 3 to the prism 4, the emitted light passes through the prism 4 and also the top lid 2. When the finger 9 is positioned on a lighted area to check a fingerprint, the light from below is substantially absorbed at valley portions of the fingerprint, and the light is mostly reflected on ridge portions of the fingerprint to enter the prism 4.

As indicated by the arrows, the light goes downward within the prism 4, and reflects again on the prisms's surface opposed to the emission unit 3 (a bottom face 4a of the prism 4). In view of the shape of the prism 4, the surface of the prism 4 opposite from the lens 5 forms a reflection surface 10 for the light, so that the light reflected on the bottom face 4a of the prism 4 is reflected on the reflection surface 10, and goes straight through the prism 4 to the lens 5.

The lens 5 is covered by a lens holder 6 and held within the case 1. Accordingly, the position of the lens 5 can be adjusted to focus the light, which has advanced through the prism 4 toward the lens 5, beyond the lens 5 by the lens 5. By adjusting to focus on the mirror 7, the fingerprint image is enlarged by the lens 5, and the light reflected on the mirror 7 reaches the image pickup device 8 to process the fingerprint as a digital image, for example.

To process a small line pattern like a fingerprint as a digital image, the dimensions of the prism 4 and the lens 5 are prescribed, and the dimension of the case 1 for accommodating them is roughly determined accordingly. But, as to the light beam for fingerprint checking, in order to accurately form a fingerprint image on the image pickup device, it is necessary to accurately set the positions of the prism 4 and the lens 5 within the case 1.

Therefore, a position adjusting means has been used as shown as schematic views in FIG. 13 and FIG. 14.

FIG. 13 is a diagrammatic sectional view showing a position adjusting means. In FIG. 13, the prism 4 is in contact with the case 1 by being pushed slightly by springs 11, 12 from two sides toward the end on the lens side in the case 1. Strength and direction of the springs 11, 12 are adjusted so that the optical axis of the prism 4 agrees with the optical axis of the lens 5 at the position where the prism 4 is pushed within the case 1 by the springs 11, 12.

FIG. 14 is similar to FIG. 13 except that screws 13, 14 are used instead of the springs 11, 12 used in FIG. 13. The screws 13, 14 are used in the same way as the springs.

In the prior arts shown in FIG. 13 and FIG. 14, the direction and strength to push the prism 4 in the case 1 toward the lens are adjusted by the springs 11, 12 or the screws 13, 14, so that prescribed alignment of the optical axes of the lens 5 and the prism 4 is easily made.

But, when an external impact is applied to the case 1 after making the adjustment, and even if it is a small impact, the pressure and the position to apply the pressure to the prism 4 by the springs 11, 12 are changed, and the optical axis of the prism 4 is deviated from the optical axis of the lens 5 and when the screws 13, 14 are used, the optical axes are deviated when the screws are loosened.

Meanwhile, various devices have been proposed to fix the lens 5.

FIG. 15 is a diagram for showing a first prior art.

A cylindrical lens guide 15 is integral with the case 1 and provided in a vertical position with respect to the surface of the prism 4. A screw hole 16 is formed on the side face of the lens guide 15, and a fixing screw 17 is driven into the screw hole 16.

In the fixing device configured as described above, the prism 4 is mounted, the lens 5 is inserted into the lens guide 15, and the bottom of the lens 5 is contacted to one surface of the prism 4. In this state, the fixing screw 17 is tightened to fix the lens 5.

FIG. 16 shows a second prior art.

A cylindrical lens guide 18 is integral with the case 1 and provided in a vertical position with respect to the surface of the prism 4. An annular guide claw 19 is formed at the leading end of the lens guide 18. And, a lens holder 20 is provided to cover the side face and bottom of the lens 5.

In the fixing device as described above, the lens 5 is inserted into the lens guide 18 prior to mounting the prism 4. When the prism 4 is mounted in this state, the bottom of the lens 5 is pressed against the surface of the prism 4. By such a pressure, the curved part of the lens 5 is caught and fixed by the guide claw 19. And, the bottom and side face of the lens 5 are fixed in close contact with the lens guide 18 and the prism 4 through the lens holder 20.

FIG. 17 is a diagram showing a third prior art.

A cylindrical lens guide 21 is integral with the case 1 and provided in a vertical position with respect to the surface of the prism 4. The leading end of the lens guide 21 has a conical surface within it and a conical claw 22 which has its center open. And, a lens holder 20 is provided to cover the side face and bottom of the lens 5.

In the fixing device configured as described above, the lens 5 is inserted into the lens guide 21 prior to mounting the prism 4. When the prism 4 is mounted in this state, the bottom of the lens 5 is pressed against the surface of the prism 4. By such a pressure, the curved part of the lens 5 is advanced in sliding contact with the surface of the conical claw 22, and the central axis of the lens 5 is aligned with the central axis of the conical claw 22. And, the bottom and side face of the lens 5 are fixed in close contact with the lens guide 21 and the prism 4 through the lens holder 20.

But, the first and second prior arts have to form the lens guides 15, 18 having accurate dimensions to align the center axis of the lens with the optical axis of the prism 4. Particularly, the dimensions are varied in a lens polishing process or other processes. It is very hard to form the lens guides 15, 18 having the dimensions conforming with such variations.

And, in the first prior art, when the fixing screw 17 was being tightened, the lens 5 was often inclined or displaced and fixed as shown in FIG. 18.

On the other hand, in the second prior art, a play is produced between the lens guide 18 and the lens holder 20 due to aging or the like. The center line (the dashed in the drawing) of the lens 5 was often deviated from the optical axis (the dotted line in the drawing) of the prism 4 because of such a play as shown in FIG. 19.

And, in the third prior art, a partial pressure which is vertically applied to the face where the curved part of the lens 5 is in contact with the conical surface is small, so that a frictional force applied between them is lowered. Since the curved part of the lens 5 is fixed by such a small frictional force, the lens 5 is easily displaced when an external shocking vibration is applied.

On the other hand, the reflecting mirror in an optical device, which is used to change the direction of the light beam by about 90 degrees, mostly uses a glass mirror.

Lately, a synthetic resin plate is often used instead of glass and metal-plated to produce the reflecting mirror in order to reduce the overall weight of the device used. Such a reflecting mirror has its back pushed by a metallic spring to stably mount the reflecting mirror.

FIG. 20 is a perspective view showing the positional relation between the reflecting mirror and the plate spring in a prior art. In FIG. 20, a reflecting mirror 23 has its back face supported by a plate spring 24. A screw hole 25 for fixing the plate spring is formed at the end of the plate spring 24, and the plate spring 24 is fixed to a case not shown.

FIG. 21 is a side sectional view of FIG. 20. In FIG. 21, the light beam L1 entered from the left in the drawing is reflected on the reflecting mirror 23 and directed downward as shown by L2.

In FIG. 21, when the original adjustment has been completed, the reflecting mirror 23 and the plate spring 24 are desired to keep a contacted state at a tangent in the horizontal direction on the back face of the reflecting mirror 23 through a point Q. But, when the leaf spring 24 is fixed by the screw, the reflecting mirror 23 and the plate spring 24 are fixed at one point (contact point) only on some midpoint of the tangent. When the material to form the reflecting mirror 23 is rigid and heavy like metal, light is not reflected in a direction against expectation even when the contact point is in a fixed state, but when the material is weaker and lighter than the reflecting mirror 23, light is reflected in a direction against expectation, so that the device is required to be adjusted again.

SUMMARY OF THE INVENTION

It is an object of the invention to provide a prism mounting device which can easily and securely position a prism against a lens with pressure within a case, in which changes in the magnitude of contact with pressure with the passage of time is very small.

It is another object of the invention to provide a lens fixing device which can securely fix a lens with its center accurately aligned with a prescribed optical axis.

It is another object of the invention to provide a reflecting mirror fixing device which has a simple structure and a contact between the reflecting mirror and a plate spring is not limited to one point.

The prism mounting device according to the invention is a prism mounting device having a prism provided on the side of a lens in a case, wherein a pair of prism press-contacting members having at least two of them interlocked on two side faces which are inclined on the side of the prism opposite when viewed from side with respect to the position where the prism is press-contacted to the bottom of the case and the lens.

The pair of prism press-contacting members in the prism mounting device of the invention is mounted on a top lid having a size to cover the prism with respect to the case and comprises at least two tapered ribs which are formed on each side to be inserted between the case and the prism.

A material for the tapered ribs of the prism mounting device according to the invention is a synthetic resin.

The prism mounting device according to the invention is a prism mounting device having a prism provided on the side of a lens in a case, wherein prism press-contacting members are disposed against a cut portion which is formed on the prism on the side opposite with respect to a position where the prism is pushed toward the bottom of the case and the lens when the prism is viewed from above.

In the prism mounting device according to the invention, when the prism press-contacting members are pushed down toward the prism's inclined faces, a force is applied to press-contact the prism toward a position, so that the prism is press-contacted toward the position within the case. At the time, the press-contacting members are at least two against the inclined surface of one side and simultaneously press-contacted to the prism with the same force, so that the press-contacting force against the prism is hardly varied by aging, impact or the like.

And, a cut portion is formed on the prism opposite from the position where the prism is press-contacted. At the pertinent position, the prism press-contacting members apply a press-contacting force toward the position where the prism is press-contacted, so that the prism is fully press-contacted. Since the force is applied toward the position where the prism is press-contacted, no aging takes place.

The prism mounting device according to the invention is not limited to a fingerprint checking device, but can also be applied to other optical devices.

The lens fixing device according to the invention comprises a cylinder having a diameter larger than a lens, and a fixing claw which is formed at the leading end of the cylinder and has an inner face with a curvature equal to or smaller than that of the lens and inclination of its optical axis with respect to a vertical face decreased toward a prescribed optical axis and an opening with a diameter smaller than the lens in the neighborhood of the optical axis.

The lens fixing device according to the invention comprises a cylinder having a diameter larger than a lens, and a fixing claw which is formed at the leading end of the cylinder and has a rotating parabolic inner face with a curvature equal to or smaller than that of the lens and the center axis aligned with a prescribed optical axis and an opening with a diameter smaller than the lens in the neighborhood of the optical axis.

In the lens fixing device according to the invention, the lens is inserted from the back of the cylinder and pushed. Thus, the lens is contacted against the fixing claw at the leading end of the cylinder. Since the face to which the lens is contacted has a curvature equal to or smaller than that of the lens, the lens is slidably contacted to the face.

Since inclination is large at a part separated from the optical axis of such a face and a partial pressure vertically applied to the face to which the lens is slidably contacted is small, a frictional force applied to the lens is small. Therefore, the lens is smoothly moved along the inclination of the face toward the center and the center of the lens is quickly aligned with a prescribed optical axis which is determined for an optical system in which the lens is provided.

And, when the lens is slidably contacted to the center of the face, a partial force vertically applied from the lens to the slidably contacting face is large because the inclination of the face is small, and a frictional force is largely applied to the lens. Therefore, the lens is firmly fixed by this frictional force.

Thus, the lens is firmly fixed with its center accurately aligned with the center axis of the face.

In the lens fixing device according to the invention, the lens is inserted from the back of the cylinder and pushed. Thus, the lens is contacted against the fixing claw at the leading end of the cylinder. On the face to which the lens is contacted, a rotation face having a parabola is formed. The parabola has a curvature which is equal to or smaller than that of the lens, so that the lens is slidably contacted to the rotation face.

The rotation face with such a parabola has a property that the inclination between the rotation face and the vertical face of the center axis is decreased toward the center axis.

Therefore, since the inclination is large in the neighborhood of the rotation face and a partial force vertically applied to the face to which the lens is slidably contacted is small, a frictional force applied to the lens is small. Therefore, the lens is moved smoothly along the inclination of the face toward the center, and the center of the lens is quickly aligned with a prescribed optical axis which is determined for an optical system in which the lens is provided.

And, when the lens is slidably contacted to the center of the rotation face, the inclination of the face at the center is small and a partial force vertically applied from the lens to the slidably contacting face is large, so that a frictional force is highly applied to the lens, and the lens is firmly fixed.

Thus, the lens is firmly fixed with its center accurately aligned with a prescribed optical axis which is the center axis of the rotation face.

The lens mounting device according to the invention is not limited to a fingerprint checking device, and can also be applied to other optical devices.

The reflecting mirror fixing device according to the invention is a reflecting mirror fixing device for fixing a reflecting mirror which is made of a material other than a metal and plated from its back by a metallic holder, wherein the metallic holder is a rectangular plate which is provided on the side behind the reflecting mirror and has a rotation base formed at its base, and a notched part is formed on the rectangular plate from its one end toward the base excepting a prescribed wide part and the notched part is bent toward the reflecting mirror to form a spring part.

The rotation base of the reflecting mirror fixing device according to the invention is a bore hole which is substantially the same size with a plate spring mounting projection formed on a plate spring mounting base.

The prescribed wide part of the reflecting mirror fixing device according to the invention is bent at substantially right angles toward the reflecting mirror to provide an auxiliary plate for the spring part.

The spring part of the reflecting mirror fixing device according to the invention has a slit formed along its middle.

In the reflecting mirror fixing device according to the invention, the reflecting mirror which is made of a material other than a metal and plated is supported from its back by the spring part having the notched part, so that the reflecting mirror can be readily fixed by the plate spring. And, the plate spring is fitted at the rotation base to the projection on the reflecting mirror mounting base. Therefore, the reflecting mirror is fixed by the plate spring in tangent contact so that fixing by only one point can be prevented.

The reflecting mirror mounting device according to the invention is not limited to the fingerprint checking device and can also be applied to other optical devices.

BRIEF DESCRIPTION OF THE DRAWINGS

FIG. 13 is a diagram showing a prior art.

FIG. 14 is a diagram showing a prior art.

FIG. 17 is a diagram showing a third conventional embodiment.

FIG. 18 is a diagram showing a disadvantageous state of the first conventional embodiment.

FIG. 19 is a diagram showing a disadvantageous state of the second conventional embodiment.

FIG. 20 is a diagram showing a prior art.

FIG. 21 is a diagram showing a cross section of FIG. 20.

BEST MODE FOR CARRYING OUT THE INVENTION

Embodiment 1

Figure 1:
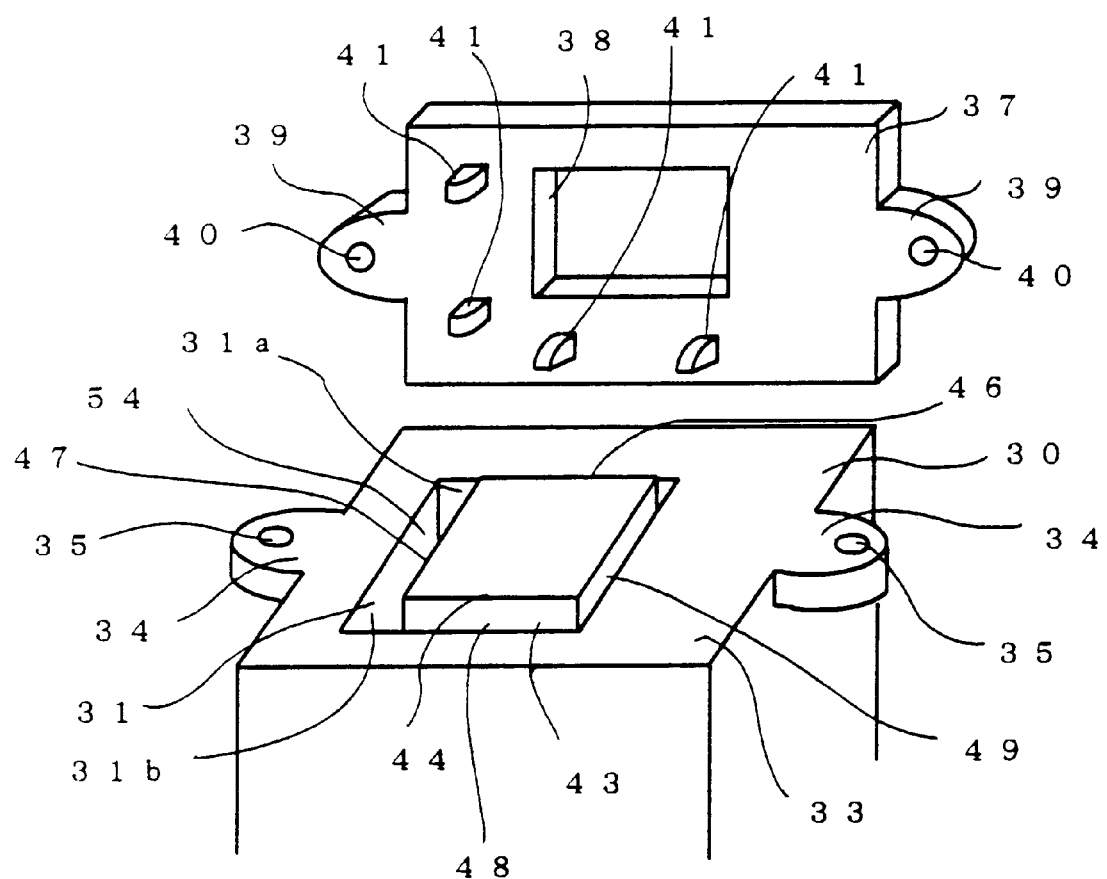
FIG. 1 is a perspective view showing an embodiment of the prism mounting device according to the present invention.
Figure 2:
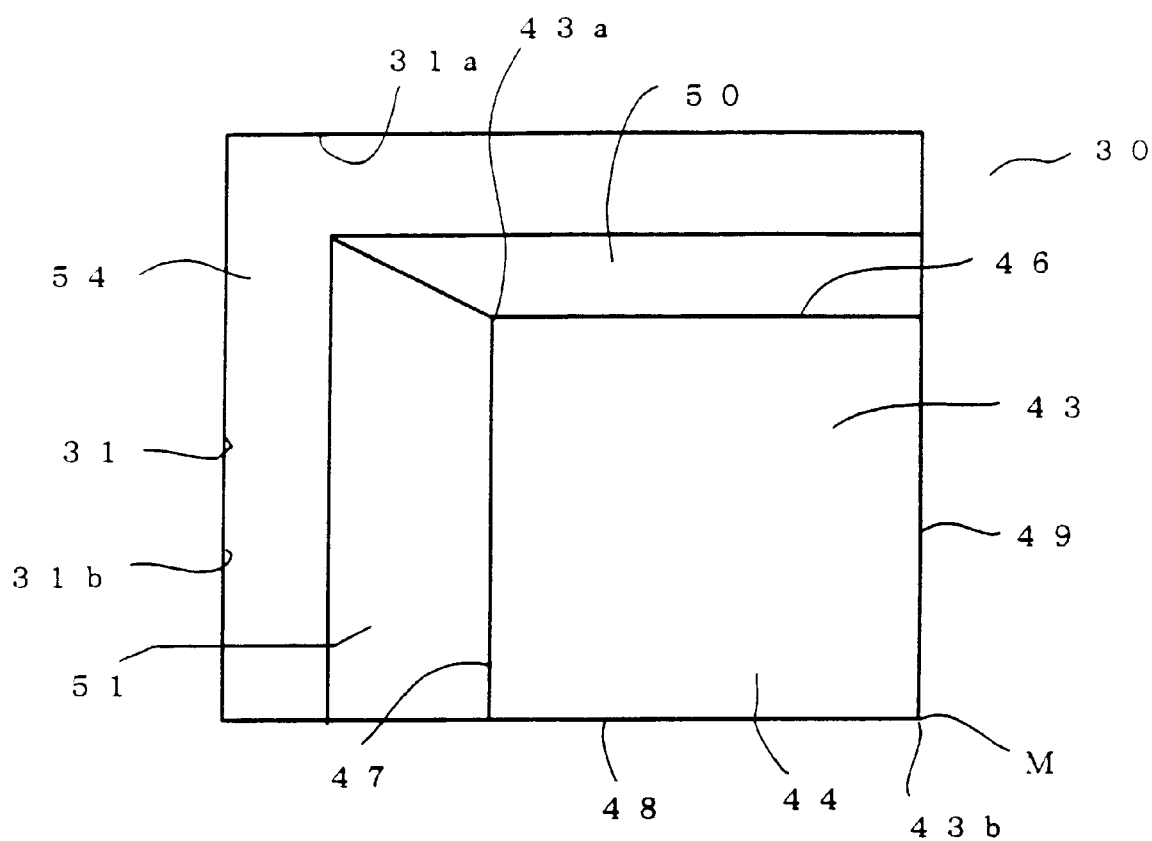
FIG. 2 is a top view of the case shown in FIG. 1.
Figure 3:
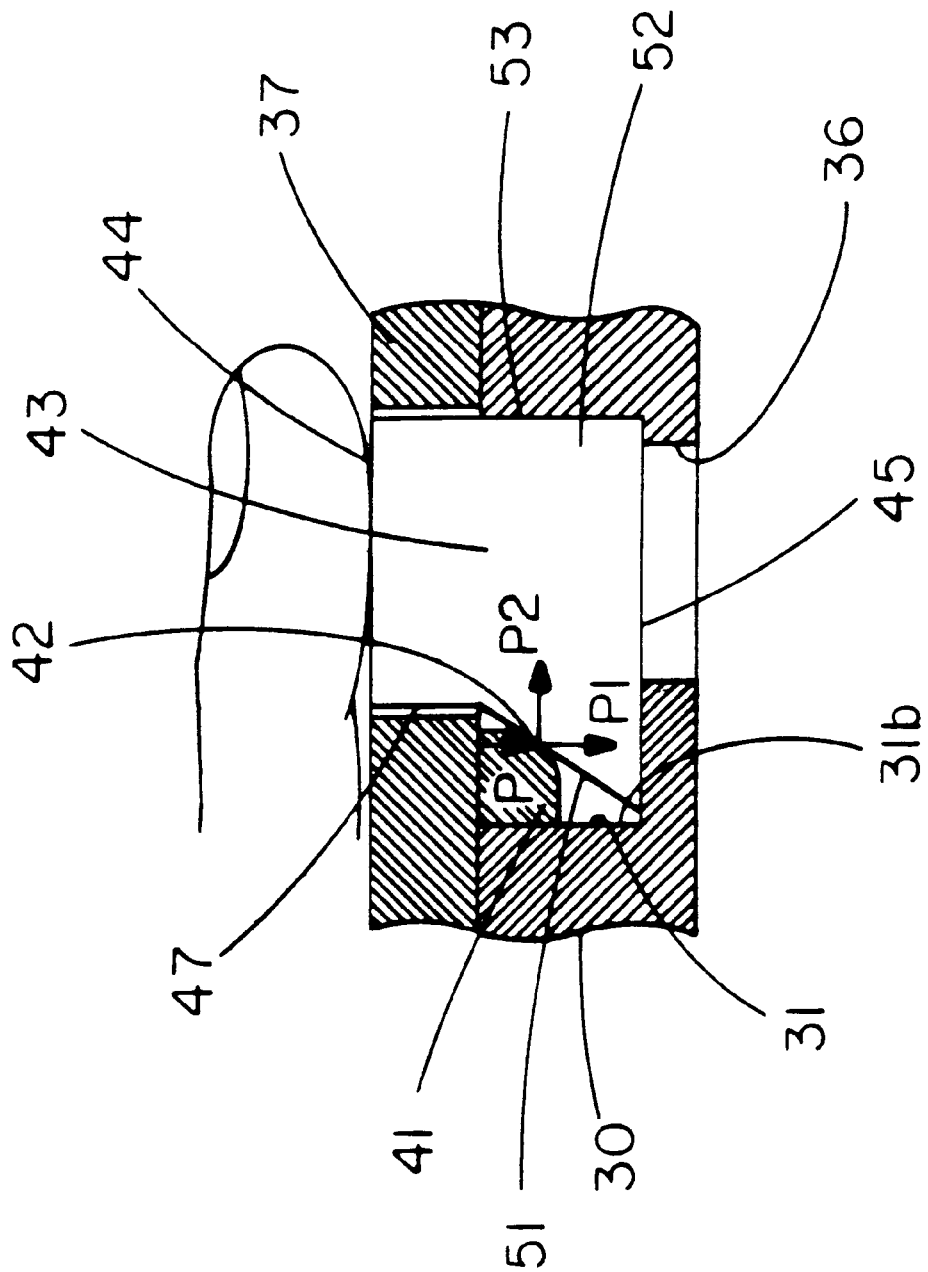
FIG. 3 is a partially sectional view of FIG. 1 with the top lid in place on the case.
Figure 12:
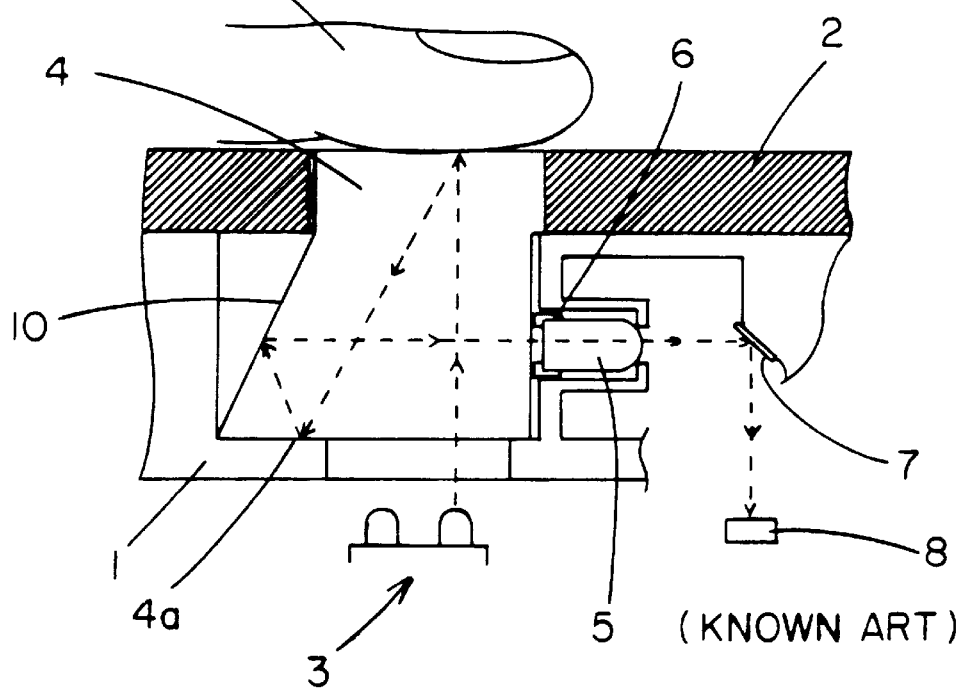
FIG. 12 is a diagram showing a prior art.
Figure 15:
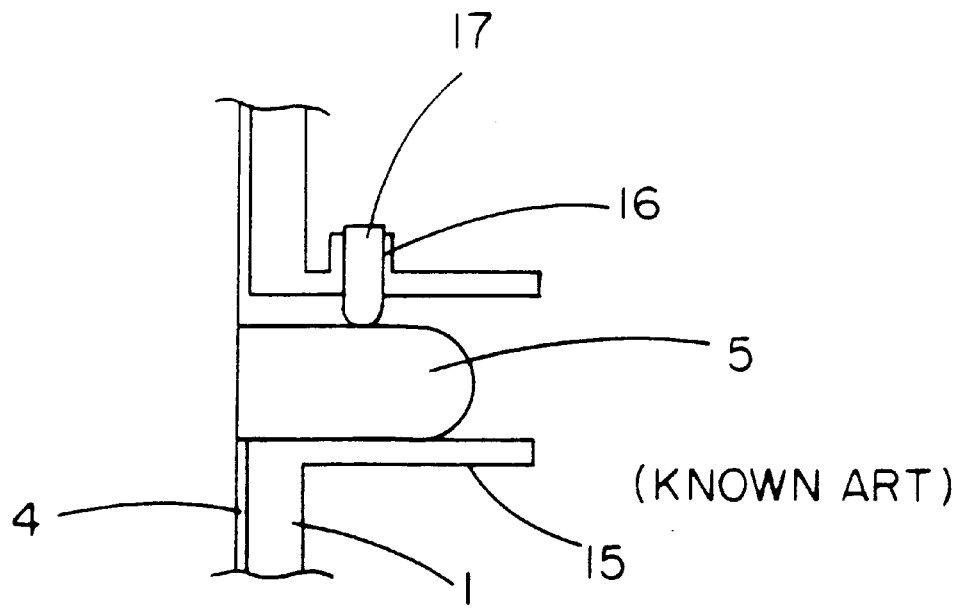
FIG. 15 is a diagram showing a first conventional embodiment.
Figure 16:
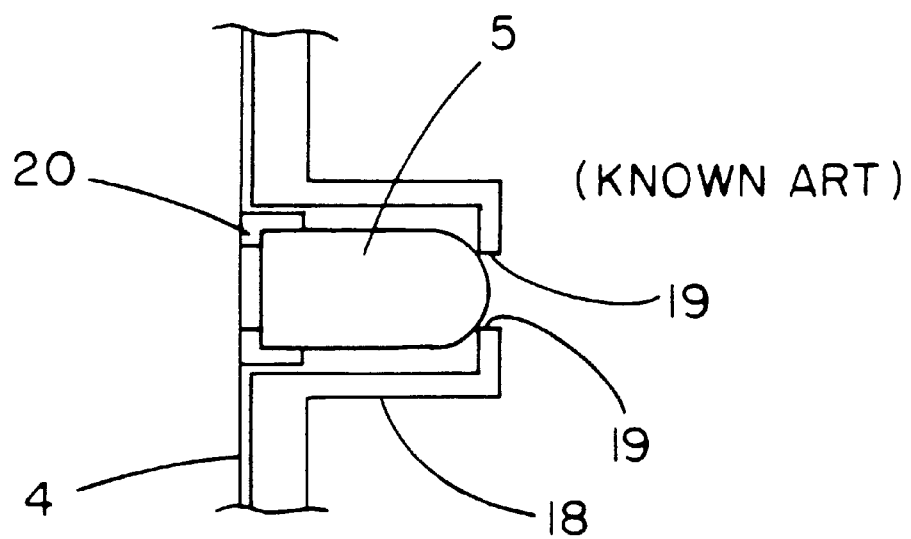
FIG. 16 is a diagram showing a second conventional embodiment.

FIG. 1 through FIG. 3 show an embodiment of applying the prism fixing device of the present invention to a fingerprint checking device. The fingerprint checking device to be described in this embodiment is housed in a case 30 in the same way as a conventional fingerprint checking device shown in FIG. 12.

The case 30 has a prism accommodating section 31 which is a recess having a rectangular cross section, and the prism accommodating section 31 has a prism 43 in it.

On the top of the case 30, a trim 33 is provided to place a top lid 37 to be described afterward, and a lug 34 having a mounting hole 35 is provided at either side of the trim 33 to fix the top lid 37. Fasteners such as a bolt and a nut which are not shown are fitted to the mounting hole 35.

As shown in FIG. 3, an opening 36 is formed at the bottom of the case 30 to allow the passage of light from an emission unit in the same way as prior art.

The top lid 37 is made of an opaque material in the same way as prior art, and an opening 38 is formed to allow the prism 43 pass through.

The top lid 37 has almost the same shape as the top face of the case 30, and a lug 39 having a mounting hole 40 formed at either side to fix to the case 30. Fasteners such as a bolt and a nut which are not shown are fitted to the mounting hole 40.

Four tapered ribs 41 are provided on the back face (the side which is faced to the case 30) of the top lid 37.

The prism 43 has a top 44 having a rectangular cross section which can be fitted to the opening 38 of the top lid 37, inclined faces 50, 51 which are formed on two side faces 46, 47 mutually connected via a corner 43a, vertical wall faces 52, 53 which are formed on two side faces 48, 49 mutually connected via a corner 43b opposite to the corner 43a, and a bottom 45 which is contacted to the bottom of the prism accommodating section 31 as shown in FIG. 2 and FIG. 3.

The top 44 which is protruded from the opening 38 of the top lid 37 is an area on which a finger is positioned.

By pressing the prism 43 against a corner M in the prism accommodating section 31, a space 54 having an L-shaped cross section is formed between the prism 43 and two side faces 31a, 31b of the prism accommodating section 31.

In this space 54 having the L-shaped cross section, the four tapered ribs 41 formed on the top lid 37 are fitted when the top lid 37 is mounted on the case 30. The dimensions of the four tapered ribs 41 and the top lid 37 are accurately determined so that the optical axis of the prism 43 is aligned with the optical axis of the lens when the four tapered ribs 41 are fitted.

In this embodiment, the top lid 37 forms a press-contacting member supporting element, and the four tapered ribs 41 form a prism press contacting member.

Now, the action of this embodiment will be described.

As shown in FIG. 1, the prism 43 is placed in the prism accommodating section 31, and the top lid 37 is mounted and fixed by bolts and nuts. As shown in FIG. 3, the top 44 of the prism 43 is protruded to almost the same level as the top face of the opening 38 of the top lid 37.

At the same time, the four tapered ribs 41 formed on the back face of the top lid 37 are fitted into the space 54 having the L-shaped cross section which is formed by the prism 43 and the two side faces 31a, 31b of the prism accommodating section 31 to push the prism 43 against the corner M.

At this time, the four tapered ribs 41 apply a force in the direction P to the inclined faces 50, 51 of the prism 43, and the force P produces partial pressures in directions P1, P2, so that the prism 43 is fully pushed against the corner M.

By pushing the prism 43 by these four tapered ribs 41, the optical axis of the prism 43 at point 42, is aligned with the optical axis of the lens.

And, since the four tapered ribs 41 have at least two of them formed on the same side as shown in FIG. 1, a stable pushing force can be kept applied to the prism 43 regardless of aging, impact or the like. Therefore, readjustment due to a change with time or displacement resulting from an impact is not required unlike the conventional springs or screws.

The four tapered ribs 41 are preferably made of a synthetic resin, so that even when the top lid 37, the tapered ribs 41, the prism 43 and the case 30 have a small error in dimensions and the top lid 37 is pressed to force the prism 43 into the case 30 and the tapered parts of the tapered ribs 41 contacted with the inclined faces 50, 51 of the prism 43, the synthetic resin forming the tapered ribs 41 has an elastic property to some extent as one of its properties and the tapered ribs 41 can push the prism 43 against the lens thanks to its elastic property. Therefore, the tapered ribs 41 are effective when provided at two or more positions.

Embodiment 2

Figure 4:
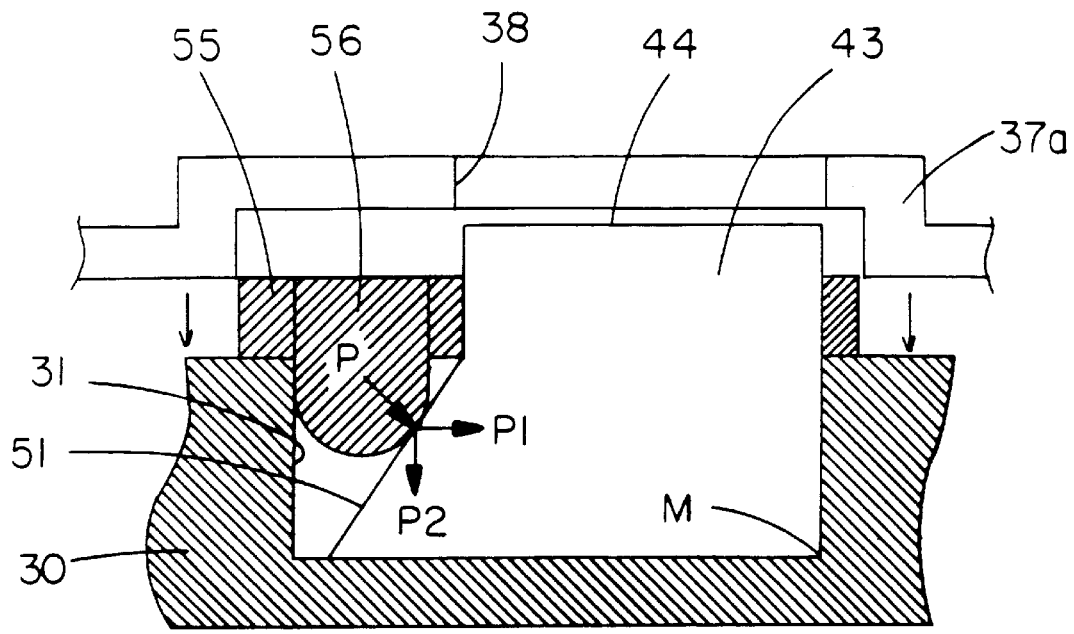
FIG. 4 is a partially sectional view showing another embodiment of the prism mounding device according to the present invention.
Figure 5:
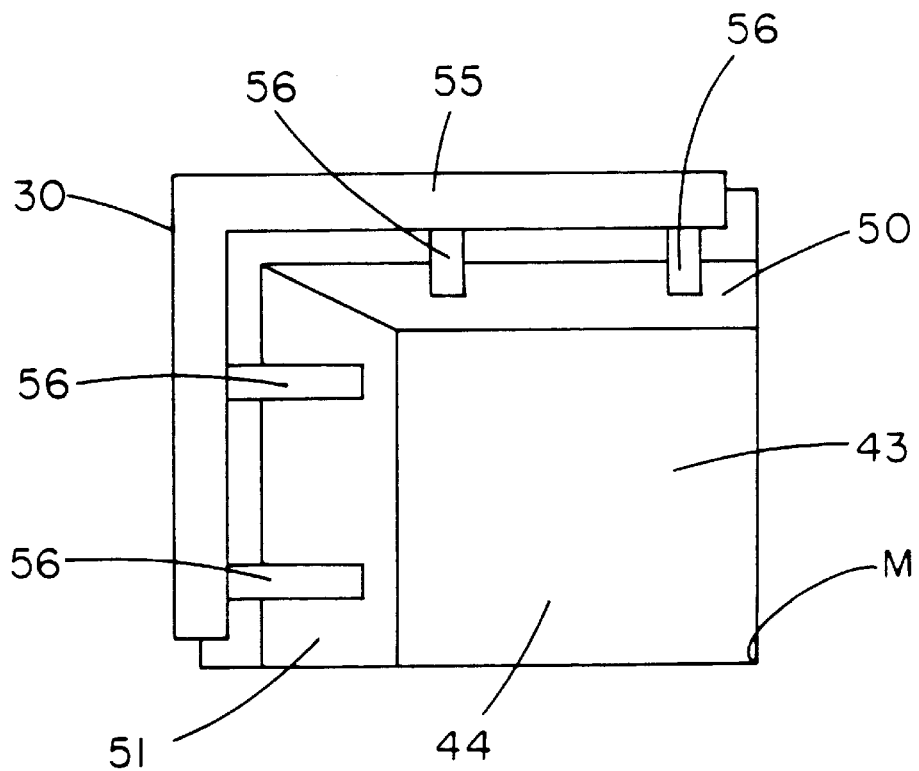
FIG. 5 is a top view of FIG. 4.

FIG. 4 and FIG. 5 show another embodiment of the prism mounting device of the present invention.

In the embodiment shown in FIG. 1 through FIG. 3, the top lid 37 configures the press-contacting member supporting element and the four tapered ribs 41 configures the prism press-contacting element. On the other hand, in this embodiment, the press-contacting member supporting element is not integral with the top lid 37, and a press-contacting member supporting element 55 having an approximately L-shaped cross section supports four tapered ribs 56.

As shown in FIG. 4, in this embodiment, a prism 43 is placed into a prism accommodating section 31, the press-contacting member supporting element 55 having an approximately L shaped cross section is disposed to extend over the corner opposed to a corner M, and a top lid 37a is mounted. Thus, the four tapered ribs 56 push inclined faces 50, 51 of the prism 43 to apply a force in the direction P against the inclined faces 50, 51, and the force P produces a partial pressure in directions P1, P2, so that the prism 43 is fully pushed toward the corner M.

This embodiment also has the same action and effect as the embodiment shown in FIG. 1 through FIG. 3.

Embodiment 3

Figure 6:
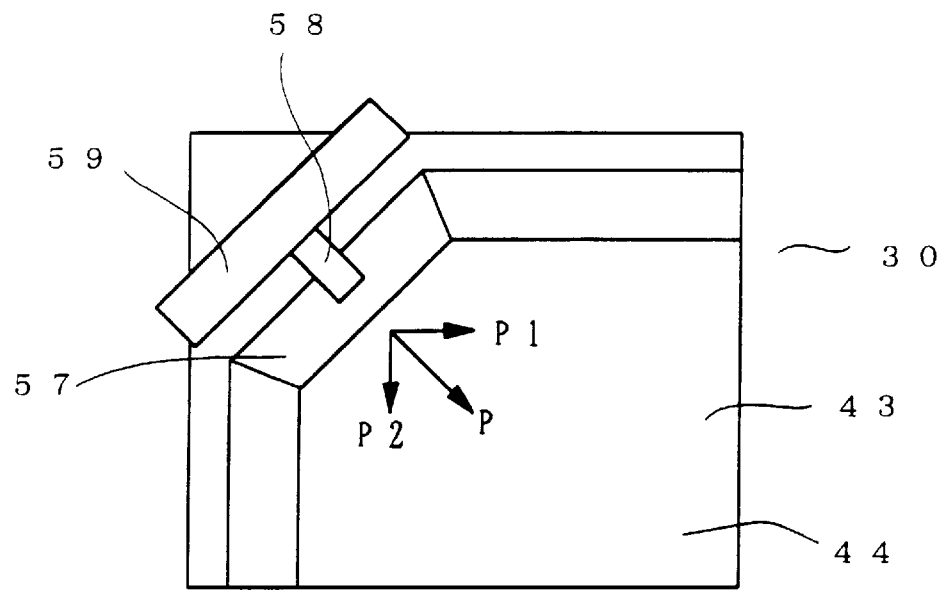
FIG. 6 is a top view of another embodiment of the prism mounting device according to the present invention.

FIG. 6 shows another embodiment of the prism mounting device according to the present invention.

In this embodiment, a cut portion 57 is formed on a prism 43 on the side opposite from a corner M so as to push the prism 43 against the corner M.

The cut portion 57 is also inclined in the same way as shown in FIG. 1. A rib 58 which is similar to the tapered rib 41 shown in FIG. 1 is formed as a press-contacting member on a top lid not shown to cover the prism 43. When the top lid is placed on the prism 43, the rib 58 is fully press-contacted toward the corner M, and the press-contacting is stable over a long period.

In FIG. 6, reference numeral 59 denotes a member for supporting the rib 58, which may be served by the top lid.

This embodiment also has the same action and effect as the embodiment shown in FIG. 1 through FIG. 3.

Embodiment 4

Figure 7:
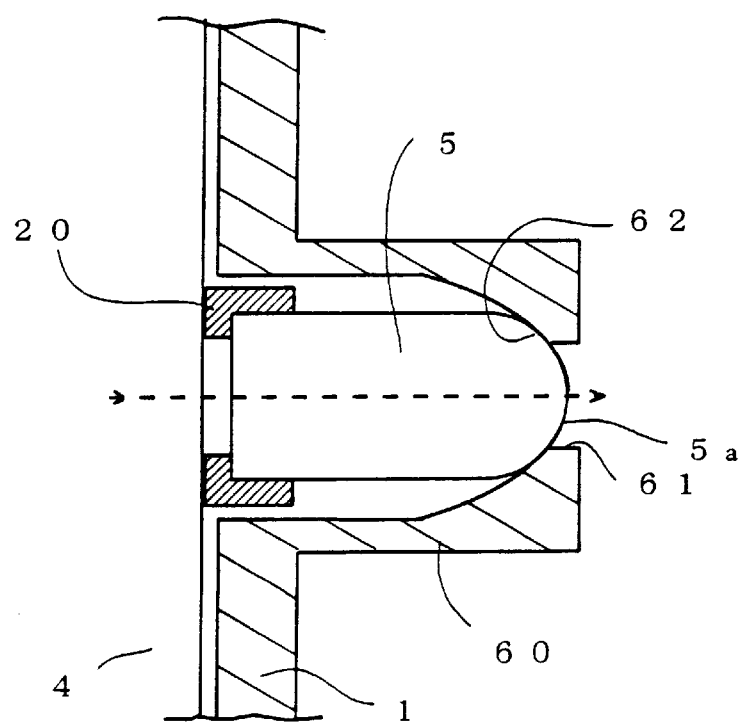
FIG. 7 is a diagram showing one embodiment of the lens fixing device according to the present invention.

FIG. 7 is a diagram showing an embodiment of the lens fixing device according to the present invention. The lens fixing device to be described in this embodiment has the same configuration with the conventional fingerprint checking device shown in FIG. 17. Like reference numerals designate like elements, merely indicating characteristic points of this embodiment.

In FIG. 7, a cylindrical lens guide 60 is integral with a case 1 and formed in a vertical position with respect to the surface of a prism 4. The leading end of the lens guide 60 has a parabolic face 62 within it with the optical axis (the dotted line in the drawing) of the prism 4 as the center axis, and a fixing claw 61 with its center open is formed. And, a lens holder 20 is provided to cover the side face and bottom of the lens 5.

In the fixing device configured as described above, the lens 5 is inserted into the lens guide 60 prior to mounting the prism 4. When the prism 4 is attached in this state, the bottom of the lens 5 is pushed against the face of the prism 4. By pushing in this way, a curved part 5a of the lens 5 is slid to be contacted to the parabolic face 62 of the fixing claw 61.

In the neighborhood of the parabolic face 62, the slide-contacted face is largely inclined, and a partial force vertically applied to the slide-contacting face is small. Therefore, a frictional force applied to the lens 5 is small, and the lens 5 is moved to slide along the inclination toward the center. Thus, the center of the lens 5 is aligned with a prescribed optical axis.

On the other hand, when the lens 5 is moved to the center of the parabolic face 62, a partial force vertically applied to a slide-contacting face becomes large because the slide-contacting face has a small inclination. Therefore, a frictional force to be applied to the lens 5 becomes large, and the lens 5 is firmly fixed to the fixing claw 61.

Thus, the lens 5 is smoothly moved with its center aligned with a prescribed optical axis and firmly fixed.

In this embodiment, the fixing claw 61 is provided with the parabolic face 62, but a curved face which has its surface inclination decreased toward the center axis may be used, and, for example, a fixing claw having a rotational surface shape with a conical curve may be used.

Embodiment 5

FIG. 8 through FIG. 11 show an embodiment of the reflecting mirror fixing device according to the present invention.

Figure 8:
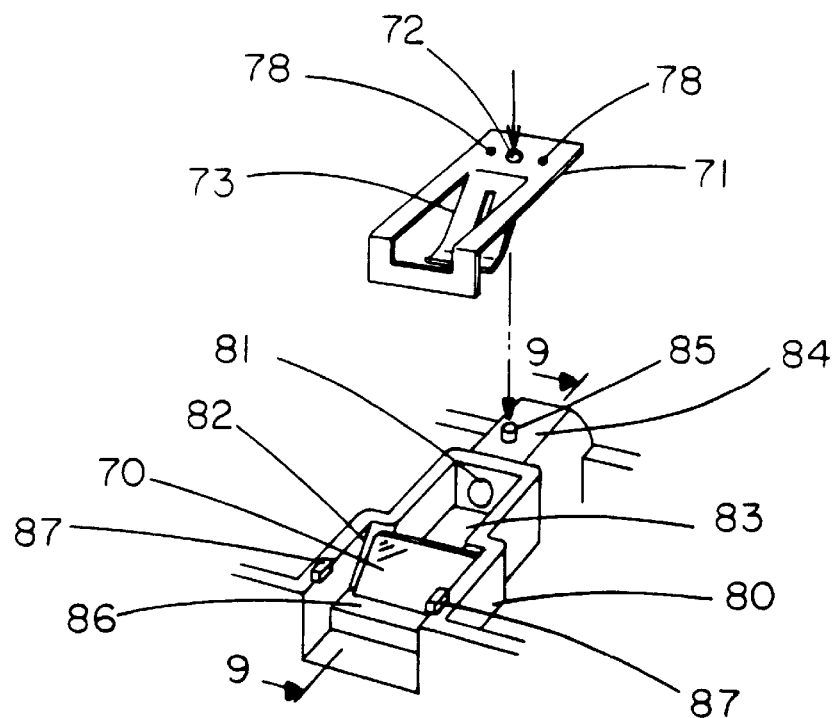
FIG. 8 is an exploded view showing an embodiment of the reflecting mirror fixing device according to the present invention.

FIG. 8 shows a case (a plate spring mounting base) 80 having a reflecting mirror 70 in it and a plate spring 71 for fixing the reflecting mirror 70 in an exploded form.

The case 80 has a hole 81 to let light in from a light source not shown, a reflecting mirror mount 82 for placing the reflecting mirror 70 in position to oppose the hole 81, an opening 83 for guiding the light reflected on the reflecting mirror 70, a plate spring holder 84 on which the plate spring 71 is placed, a plate spring fitting projection 85 formed on the plate spring holder 84, a stepped portion 86 for limiting the lower limit position of the plate spring 71, and stoppers 87 for preventing the plate spring 71 from jumping upward.

The plate spring 71 is made of a rectangular plate spring material, and has a hole 72 which is formed at one end and center of the plate spring, a position restricting part 77 which is bent at almost right angles at the end opposite from the hole 72, a reflecting mirror holder 73 which is formed between the hole 72 and the position restricting part 77 into a forked shape with its end bent in the form of a circular arc on the side of the position restricting part 77, and projections 78 formed on either side of the hole 72.

The reflecting mirror holder 73 has two tongues 74, 75 with a slit 76 between them, and they have curved reflecting mirror contacts 74a, 75a, respectively.

Figure 9:
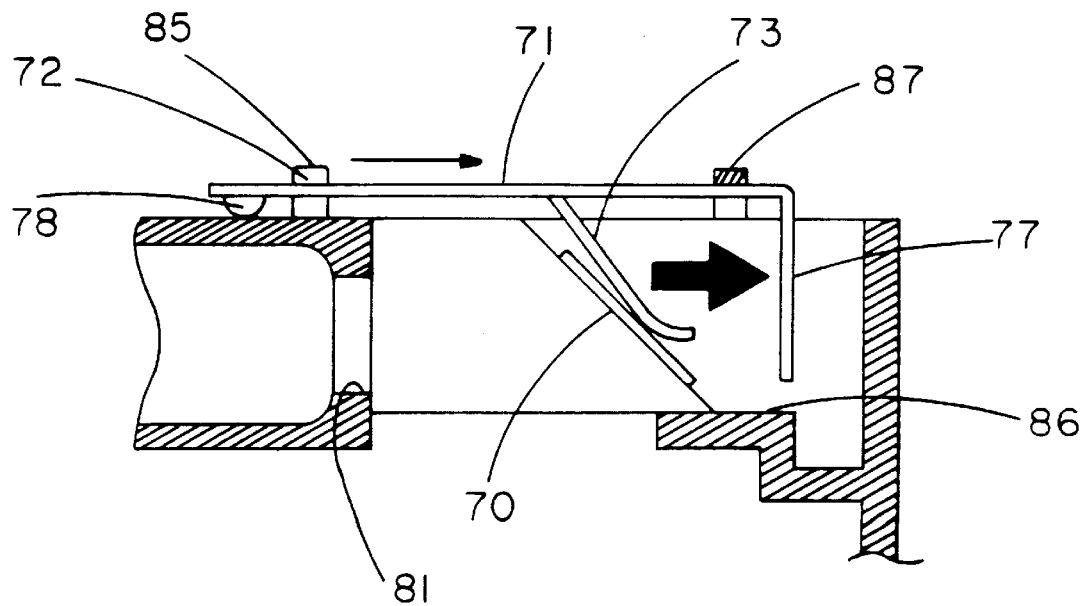
FIG. 9 is a sectional view showing an embodiment of the reflecting mirror fixing device according to the present invention.

The plate spring 71 has a base on the side where the hole 72 is formed, and the hole 72 is a bore hole which is an embodiment of a rotary standard part. As shown in FIG. 9, when the plate spring 71 is to be mounted on the case 80, the hole 72 is fitted to the plate spring fitting projection 85 of the case 80, so that the plate spring 71 can be fixed to the case 80 without using a screw. After fitting, the plate spring 71 is fixed by stoppers 87 on the back of the reflecting mirror 70.

By the projections 78 formed on both sides of the hole 72, the plate spring 71 can be turned easily without deflecting vertically or horizontally when the plate spring 71 is rotated with the hole 72 as the center.

The position restricting part 77 of the plate spring 71 is positioned with its end slightly away from the stepped portion 86 of the case 80 when the plate spring 71 is mounted on the case 80.

As shown in FIG. 9, if a force, which pushes the plate spring 71 upward, is applied by a resiliency of the reflecting mirror holder 73 due to the movement of the plate spring 71 in horizontal direction and the displacement of the reflecting mirror 70 when the reflecting mirror 70 is being pressed by the reflecting mirror holder 73, the stoppers 87 provided on the case 80 prevent such movement, thereby preventing the plate spring 71 from separating from the case 80.

As described above, in this embodiment as shown in FIG. 9, when the plate spring 71 is mounted on the case 80, the reflecting mirror 70 is fixed to the case 80 by a spring force of the plate spring 71.

Figure 10:
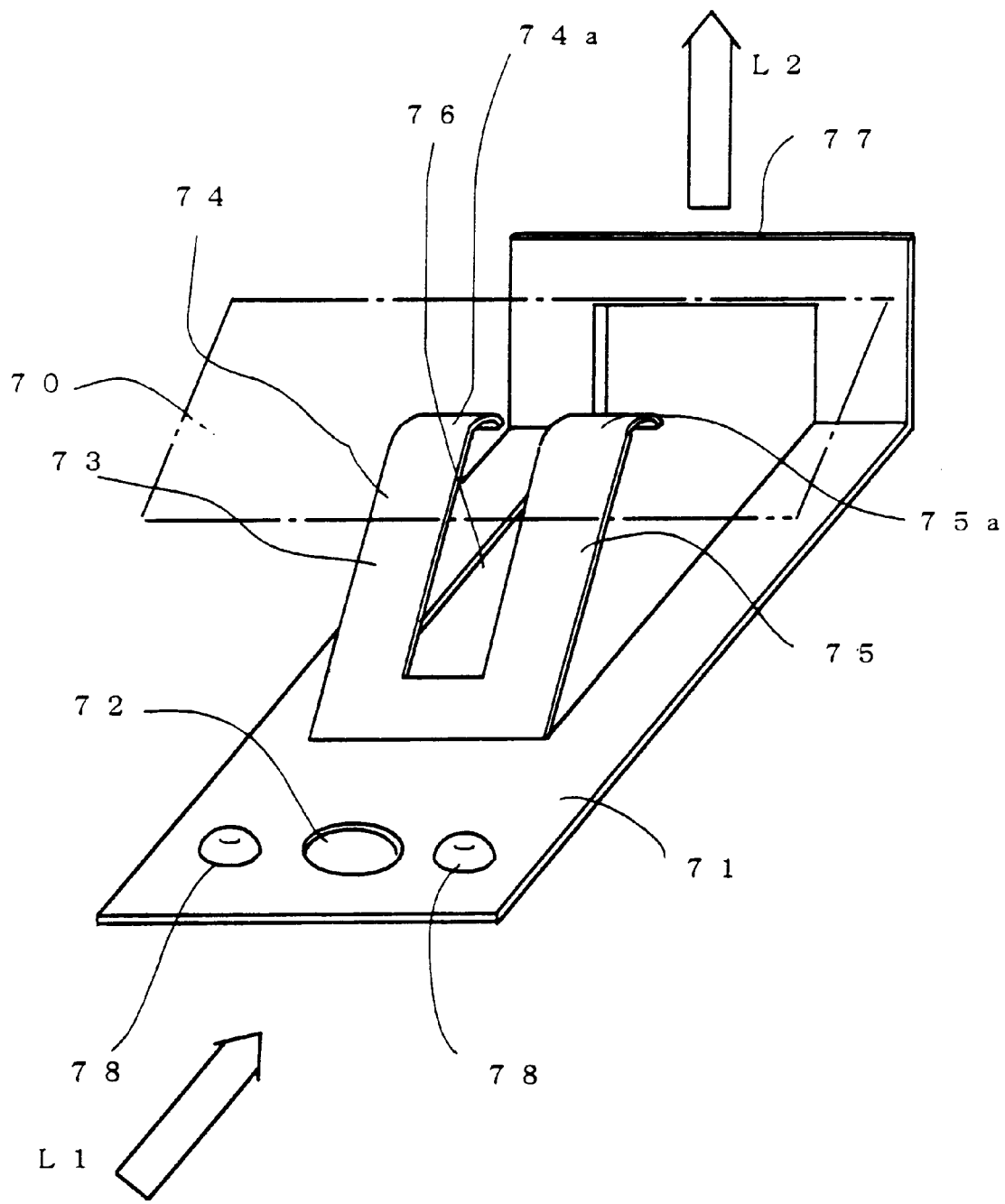
FIG. 10 is a perspective view showing the plate spring shown in FIG. 8.

The dashed line in FIG. 10 indicates the reflecting mirror 70, and the back of the mirror is fixed by the plate spring 71. Therefore, incident light is in a direction of, for example, L1, with respect to the reflecting mirror 70, and outgoing light is in a direction of L2. The light may be directed in the opposite direction.

In the structure shown in FIG. 10, the plate spring 71 is desired to have the slit 76. Even if the plate spring 71 and the reflecting mirror 70 are displaced, since the plate spring 71 is fixed to the case 80 by utilizing a resiliency of the reflecting mirror holder 73 without using a spring and can be rotated with the hole 72 as the base even after fixing as shown in FIG. 9, a fixed state at only one point as in the case of fixing by a screw can be prevented, and the spring 71 can keep supporting the reflecting mirror 73 on a tangent line.

Figure 11:
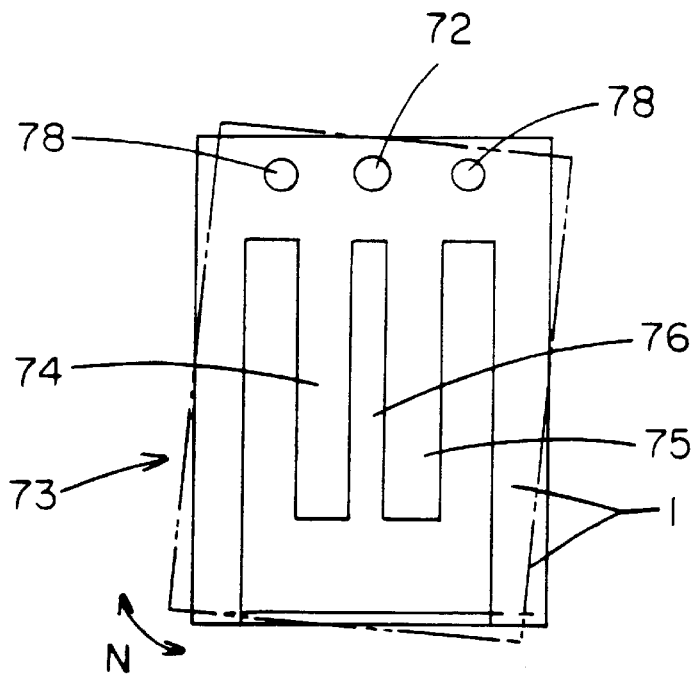
FIG. 11 is a diagram showing a state of FIG. 10 after a lapse of time.

In FIG. 11, the broken line indicates that even when the plate spring 71 is rotated as the reflecting mirror 70 is moved in direction N, it can be turned smoothly thanks to the projections 78.

In the present invention, the reflecting mirror is prepared by plating metal or a material other than metal.

Industrial Applicability

According to the prism mounting device of the invention, the prism can be firmly press-contacted against the lens to align with the optical axis within the case by a relatively simple structure. And, in press-contacting, since processing can be made by a so-called "face contact", the aligned optical axis is not deviated by an impact and stable with a lapse of time. Besides, when an elastic member is used to configure, it is advantageous for mass-production since the adjusting position is constant even when an operator is different.

According to the lens fixing device of the invention, since a frictional force to be applied to the lens in the neighborhood of the fixing claw is small, the lens is smoothly moved and the center of the lens can be quickly aligned with a prescribed optical axis.

And, since a frictional force to be applied to the lens is large at the center of the fixing claw, the lens can be firmly fixed with the center of the lens accurately aligned with a prescribed optical axis. As a result, the lens is not displaced even if a shocking vibration is applied.

Therefore, in the fingerprint checking device to which the present invention is applied, since the lens is accurately positioned and not displaced, the image of a fingerprint can be accurately focused on the image pickup device, improving the capacity of checking the fingerprint.

According to the reflecting mirror fixing device of the present invention, the reflecting mirror is readily fixed by the simply configured plate spring, and the fixed state is based on the contact on the tangent line when adjusted, so that the obtained fixing is stable with a lapse of time.

What is claimed is:

1. A prism mounting device having a prism provided on the side of a lens in a case, wherein the prism is provided with an inclined face on two neighboring faces with a corner therebetween, and a press-contacting member is provided at a position to oppose inclined faces to push the prism toward the lens and against the corner, to thereby simultaneously fix the prism firmly in place and position the prism so that the center of the prism is aligned with the optical axis of the lens.

2. The prism mounting device according to claim 1, wherein the press-contacting member is mounted on a top lid, the top lid having a size to cover the prism with respect to the case and comprises at least two tapered ribs which are formed on each side to be inserted between the case and the prism, to thereby push the prism against the lens and maintain the position without requiring readjustment.

3. The prism mounting device according to claim 2, wherein the tapered ribs are made of a synthetic resin.

4. The prism mounting device according to claim 1, wherein the press-contacting member comprises at least two tapered ribs which are formed on each arm of a supporting member having an approximately L-shaped cross section to be mounted on the case via a corner of the case, and the supporting member having the approximately L-shaped cross section is configured to be detachable between a top lid and the case, and when it is pressed from above by the top lid, the at least two tapered ribs formed on each arm are inserted between the case and the prism to push the prism toward the lens via the inclined faces of the prism.

5. A prism mounting device according to claim 4, wherein the tapered ribs are made of a synthetic resin.

* * * * *

UNITED STATES PATENT AND TRADEMARK OFFICE
CERTIFICATE OF CORRECTION

PATENT NO. : 6,144,511
DATED : November 7, 2000
INVENTOR(S) : UMETSU et al.

It is certified that error appears in the above-identified patent and that said Letters Patent are hereby corrected as shown below:

Column 8, line 7, after "43" and insert --at point 42--.

Signed and Sealed this

Eighth Day of May, 2001

Attest:

NICHOLAS P. GODICI

*Attesting Officer*  *Acting Director of the United States Patent and Trademark Office*